Aug. 2, 1966   B. WALLACE   3,264,450
ELECTRIC HEATING SYSTEM FOR AN AUTOMOTIVE VEHICLE
Original Filed May 8, 1962   3 Sheets-Sheet 1

BAIRD WALLACE
INVENTOR
BY John R. Faulkner
Keith L. Zerschling
ATTORNEYS

BAIRD WALLACE
INVENTOR

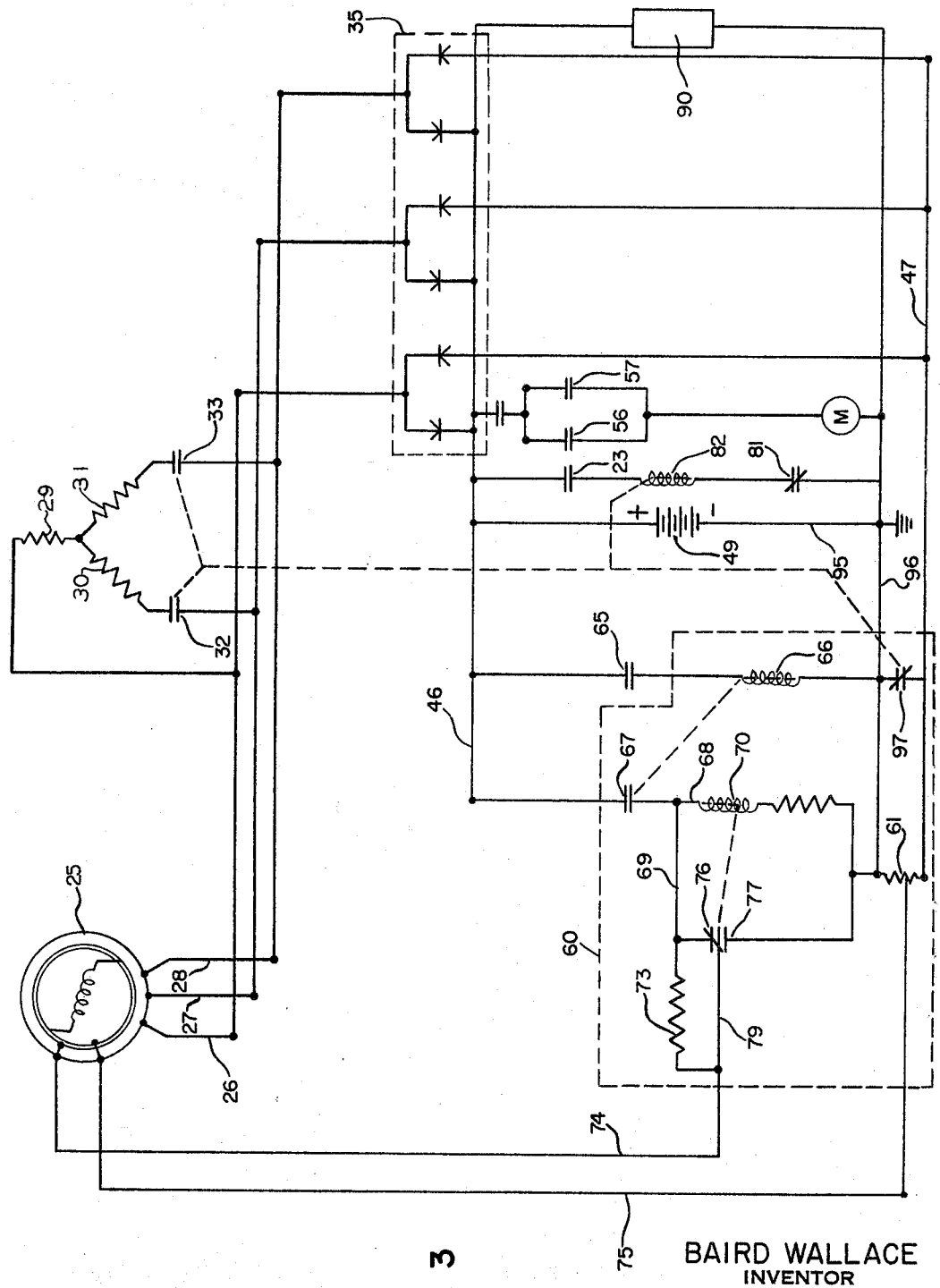

United States Patent Office 3,264,450
Patented August 2, 1966

3,264,450
ELECTRIC HEATING SYSTEM FOR AN AUTOMOTIVE VEHICLE
Baird Wallace, Grosse Ile, Mich., assignor to Ford Motor Company, Dearborn, Mich., a corporation of Delaware
Continuation of abandoned application Ser. No. 193,109, May 8, 1962. This application Mar. 6, 1964, Ser. No. 350,938
18 Claims. (Cl. 219—279)

This application is a continuation of my copending application Serial No. 193,109, filed May 8, 1962, now abandoned.

This invention relates to an improved heating system. More particularly, the invention relates to an improvement in a heating system of the type described in copending U.S. application S.N. 350,142, filed March 4, 1964, as a continuation of S.N. 192,790, filed May 7, 1962, now abandoned, and assigned to the assignee of the instant invention.

The invention utilizes a means capable of instantly supplying heat to the passenger compartment. This instant heat or quick heat means cooperates with a well-known radiator type of heating element which does not supply sufficient heat to warm the passenger compartment during the warm-up period of vehicle operation. The quick heat means is, therefore, generally operative during this warm-up period to instantly supply heat for warming the passenger compartment. When the operating temperature of the automotive vehicle reaches a point at which adequate heat is supplied to the passenger compartment by the radiator heating element, the operation of the quick heat means will be automatically terminated.

The preferred embodiment of the instant invention utilizes electric quick heat coils controlled by a control means that takes the form of a circuit which operates the electric quick heat coils when the radiator heating element is not contributing substantial amounts of heat to the passenger compartment. The control circuit also enables the alternator of the automotive vehicle to operate in an unregulated mode when the electric quick heat coils are operative. The utilization of an unregulated alternator provides a maximum amount of electrical energy for heating the passenger compartment. A sensing means or temperature sensitive element is included in the control circuit for sensing when the automotive vehicle has warmed up to a temperature at which the passenger compartment temperature can be maintained solely by the radiator heating element. When this temperature is sensed, the sensing means generates a signal which results in the control circuit terminating the unregulated mode of operation and removing the electric quick heat coils from the circuit.

The quick heat mode of operation is initiated and terminated by the control circuit in such a manner that the danger of any damage that might be caused by electrical transients is eliminated. Further, the circuit provides the necessary control while utilizing a minimum of parts and involving little, if any, modification of the existing automotive electrical and heating system.

The general object of the invention is the provision of a heating system for an automotive vehicle which will instantaneously heat the passenger compartment.

Another object of the invention is the provision of a quick heat system that will require little, if any, modification of the existing automotive vehicle heating and electrical systems and that will require a minimum number of additional parts.

Another object of the invention is the provision of a control circuit for the quick heat system that will enable the alternator of the automotive vehicle's electrical system to switch from a regulated or unregulated mode of operation with no danger of damage to the electrical system of the vehicle.

Other objects and advantages will become obvious as the specification is read in connection with the drawings, wherein:

FIGURE 3 is a schematic diagram of an alternate embodiment of the electrical circuit of the instant invention.

Figure 1:
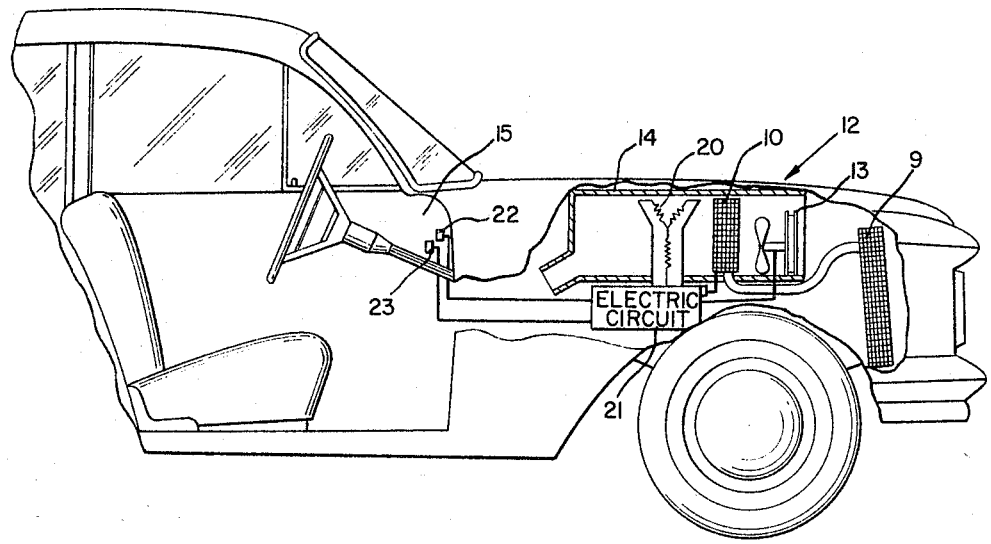
FIGURE 1 is a schematic diagram of the overall heating system.

The overall heating system is shown in FIGURE 1. The system includes a primary heating means such as the radiator heating element 10 which is commonly used in automotive vehicle heating systems. The radiator heating element 10 is connected to the radiator 9 of the automotive vehicle and is associated with a ventilation system 12 which includes fan 13 located adjacent the radiator heating element 10 and the conduit 14 which is operatively coupled to the radiator heating element 10 and the passenger compartment 15. The fan 13 directs a stream of air over the radiator heating element 10 and through the conduit 14 into the passenger compartment 15, thereby heating said compartment. In addition to this conventional structure, the invention embodies an instant heat or quick heat means such as electric heating coils 20 which are placed in the conduit 14. The fan 13 directs a stream of air over the radiator heating element 10 and the heating coils 20, thereby removing heat from both sources.

The electric heating coils 20 are connected to an electrical circuit 21 which controls the energization of the electric heating coils 20 and the fan 13. The ignition switch 22 and the heater switch 23 are connected to the electrical circuit 21 and control the energization of the heating coils 20 and the electrical circuit 21, which circuit is hereinafter described in detail.

The electrical circuit 21 includes an alternator 25 which is suitable for use in an automotive vehicle electrical system. The alternator 25 may be a three-phase alternator which includes armature windings (not shown) that are connected by conductors 26, 27 and 28 to feed the electric heating coils 20. The electric heating coils 20 comprise Y-connected coils 29, 30 and 31 which are connected to the conductors 26, 27 and 28, respectively. The normally open contacts 32 and 33 are interposed in the connection between the coils 30 and 31, respectively, and controlled by the relay coil 82 as indicated by the broken line 54.

Conductors 26, 27 and 28, which are connected to the alternator 25, are also connected to feed the rectifier 35 which is composed of the diodes 36–41. These diodes are arranged in two groups 36, 38, 40 and 37, 39, 41 with each group containing three diodes. The cathodes of the first group of diodes 36, 38 and 40 are connected to the anodes of the diodes of the second group 37, 39 and 41 by means of leads 42, 43 and 44 which are connected to the conductors 26, 27 and 28, respectively. It should be understood that the rectifier utilized might be any of the commonly used rectifiers such as the bridge or center tap transformer type of rectifiers.

The anodes of the diodes 36, 38 and 40 are electrically connected to form the positive terminal 46, while the cathodes of the diodes 37, 39 and 41 are connected to form the negative terminal 47 of the rectifier 35. The positive terminal 46 is connected through normally closed contacts 48 to the positive terminal of the battery 49, while the negative terminal 47 is connected to the negative terminal of the storage battery 49, which is connected to ground. Thus in this embodiment, the storage battery 49 is connected across the terminals of the rectifier 35.

The fan 13 is connected across the positive terminal 46 and the negative terminal 47 of the rectifier 35 by a conductor 55 that has normally closed contacts 48 connected in series with normally open contacts 56 and 57 which are connected in parallel. The contacts 48 are controlled by the relay coil 82 as indicated by the broken line 54, while the normally open contacts 56 and 57 are controlled by the heater switch 23 and a manual switch (not shown), respectively. It should be noted that in order for the fan 13 to be energized, the contacts 56 or 57 must be closed.

A regulator circuit 60 is also connected across the positive terminal 46 and negative terminal 47 of the rectifier 35. The regulator circuit 60 has a voltage limiting or voltage divider resistor 61 connected to the positive terminal 46, the conductor 62 and the conductor 63. The conductor 62 is connected intermediate the ends of the resistor 61 while the conductor 63 is connected to the extreme end of the resistor 61. Normally closed contacts 64 are connected to the conductors 62 and 63 and, consequently, are normally in a short circuit relationship with the end portion of the resistor 61. The resistor 61 may very between ½–2½ ohms depending on the alternator saturation characteristics and the maximum load. The ratio of the resistance connected between the conductors 62 and 63 and the resistance connected between the conductors 46 and 62 may vary between 1.5–2.0 to 1. When the contacts 48 and 64 are open, the resistor 61 serves to limit the current applied to the battery and the load, while the portion of the resistor 61 between the positive terminal 46 and conductor 62 limits the current supplied to regulator circuit. The ohmic value of this first portion of the resistor 61 is dependent on the saturation characteristics of the alternator. It should also be noted that when the contacts 64 and 48 are closed, the resistor 61 is short circuited.

The relay 66 and the normally open contacts 65 which are controlled by the ignition switch 22 are connected in circuit across the conductor 63 and the negative terminal 47. The conductor 62 is connected to normally open contacts 67 which are controlled by the relay coil 66, as indicated by the broken line 50. The open contacts 67 prevent the battery 49 from discharging via the conductor 62, the regulator circuit 60 and the field coil of the alternator 25 to ground. The specific discharge path will become obvious from the subsequent description.

The normally open contacts 67 are connected to two circuit branches 68 and 69, which form the voltage regulating portion of the regulator circuit. The circuit branch 68 has relay coil 70 connected in series with the resistor 71, which in turn is connected to ground through the normally closed contacts 72 operated by the relay coil 82 as indicated by the broken line 54.

The circuit branch 69 has a resistor 73, which is connected to the field coil (not shown) of the alternator 25 by the conductor 74. The field coil of the alternator 25 is, in turn, connected to ground by the conductor 75. The normally closed contact 76 operated by the relay coil 70 and the conductor 79 normally form a short circuit around the resistor 73, while the opening of normally closed contact 76 will place the resistor 73 in series with the field coil of the alternator 25. The normally open contact 77 is also operated by the relay coil 70. The resistor 73 may be connected to the contact 77 by the conductor 79 and the contact 77 is, in turn, connected to ground via the conductor 78 and the normally closed contacts 72.

The relay coil 70 will open the normally closed contacts 76 when a first selected voltage is reached and when a second higher selected voltage is reached, the normally open contact 77 will be closed connecting the resistor 73 directly to ground and short circuiting the field coil.

The normally open contacts 91 controlled by the manually operable heater switch 23, the normally closed temperature responsive switch 81 and the make-break relay coil 82 are connected in series across conductor 63 and the negative terminal 47 to form the quick heat circuit branch 80. The sensing means or temperature responsive switch 81 may be a commonly used bimetal switch which is located adjacent the radiator heater element 10 and which opens when the water or cooling media circulating in the radiator heating element 10 reaches a selected temperature. The make-break relay coil 82 controls the contacts 32, 33, 48, 64 and 72 as indicated by the broken line 54. When the relay coil 82 is energized, it will first operate the contacts 32 and 33 and subsequently operate contacts 48, 64 and 72. The de-energization of the make-break relay coil 82 will initially release contacts 48, 64 and 72 and then release contacts 32 and 33. The temperature responsive switch 81 and the relay coil 82 with associated contacts 32 and 33 may be considered as a control means for the electric quick heat means 20.

The circuit disclosed above in detail has a regulated and an unregulated or quick heat mode of operation. The regulated mode of operation exists when the ignition switch 22 is operated to close the contacts 65 and when the automotive vehicle is operating. The operation of the automotive vehicle causes the alternator 25 to generate a voltage which is applied across positive terminal 46 and negative terminal 47. The generated voltage is applied to drive the accessory load 90 via conductor 92, to charge the battery 49 via the normally closed contacts 48 and to energize the field coil of the alternator 25 through the regulator circuit 60.

When the regulated mode of operation exists, the regulator circuit operates in the usual manner to control the alternator. The contacts 48 and 64 are closed, and the conductors 62 and 63 are essentially at the same voltage as the positive terminal 46 and this voltage is applied to the battery 49 and the relay coil 66. The relay coil 66 will close the contacts 67 when the alternator is generating a selected voltage sufficient to cause a battery charging current. With the contacts 67 closed, a voltage will be applied to the relay coil 70, the resistor 71, the resistor 73 and field coil of the alternator 25. As the voltage applied to the field coil increases, the generated voltage and the voltage applied to the relay coil 70 will increase. When a first selected voltage is reached, the conductor 79 will vibrate between an open position and contact 76 and when a second selected voltage is reached, the conductor 79 will vibrate between an open position and contact 77. When the conductor 79 is vibrating between contact 76 and an open position, the resistor 73 will be alternately placed in series with the field coil of the alternator 25 and then short circuited, thus limiting the voltage applied to the field coil. When the conductor 79 is vibrating between the contact 77 and the open position, the resistor 73 is first placed in series with the field coil and then the field coil will be short circuited via conductor 75, conductor 74, conductor 79, contact 77, conductor 78 and normally closed contact 72, thereby greatly limiting the effective voltage applied to the field coil.

The above-described operation of the regulator circuit 60 is similar to the operation of the regulators commonly used in automotive vehicles and disclosed in the U.S. Patent 2,774,842 to Shrader.

The unregulated or quick heat mode of operation is initiated by the manipulation of the manually operable heater switch 23 which closes the contacts 91 and 56. The closure of contact 56 causes the fan 13 to be energized. The closure of the contacts 91 causes a voltage to be applied across the relay coil 82 which first closes contacts 32 and 33, causing the heating coils 29 to be energized and then opens contacts 48, 64 and 72, which limits the amount of charging and accessory load current available and minimizes the effectiveness of the regulator circuit. The opening of the contacts 64 and 48 causes the first portion of resistor 61 and the conductor 62 to form the only path from the positive terminal 46 of the rectifier 35 to the circuit branches 68 and 69 of the regulator circuit 60. The first portion of the resistor 61 serves to limit the current supplied to the regulator circuit since it is in series with the positive terminal 46 of the rectifier 35. The entire length of resistor 61 now serves to limit the current supplied to the conductor 63 and the parallel circuit branches formed between the conductor 63 and the negative terminal 47. It should be noted that the current supplied to the parallel branches formed in part by the battery 49 and the accessory load 90 is limited to a greater extent by the resistor 61 than the current supplied to conductor 62.

The voltage that now exists across the conductor 63 and the negative terminal 47 is sufficient to cause the relay 66 to close the contacts 67, thereby completing a circuit path from the positive terminal 46 to the circuit branches 68 and 69. The opening of the contact 72 by the relay coil 82 opens the path that normally exists from the circuit branch 68 through the relay coil 70, the resistor 71 and the normally closed contacts 72 to ground. The opening of this path to ground prevents current from flowing through the relay coil 68 and thus causes the conductor 79 to remain in the normally closed position short circuiting the resistor 73. The path completed during the unregulated mode of operation is to be contrasted with the paths which the conductor 79 completes during the regulated mode of operation which effectively limit the voltage applied across the field coil of the alternator 25. It should be apparent from the comparison of the unregulated and regulated circuit paths that the voltage applied to the field coil of the alternator 25 is considerably higher during the unregulated mode of operation. This results in a maximizing of the generated voltage and consequently the energy supplied to the heating coils 20.

In summary, during the unregulated mode of circuit operation, the effectiveness of the regulator circuit is reduced, causing the voltage applied to the field coils to increase, resulting in the alternator generating a higher voltage which consequently results in higher voltage being applied to the field coil of the alternator. The higher generated voltages are applied to the heating coils 29, 30 and 31, resulting in a virtually instant heating of the coils and consequently an immediate warming of the passenger compartment of the automotive vehicle.

When the automotive vehicle has warmed up, the cooling media which flows through the radiator heating element 10 will warm to a point whereby the temperature of the passenger compartment may be maintained solely by the air flowing over the radiator heating element 10. When this condition is sensed, the temperature sensitive switch 81 will open causing the relay 82 to be de-energized, which results in the closing of the contacts 48, 64 and 72 to restore the regulator circuit 60 to normal operation and then in the opening of the contacts 32 and 33 to disconnect the heating coils 29, 30 and 31 from the alternator circuit. It should be noted that the regulator circuit is restored to normal operation prior to the disconnecting of the heating coils 29, 30 and 31. This sequence of contact operation prevents any circuit damage that might be caused by the large electrical transients that may develop when connecting or disconnecting circuit elements.

It should be understood that the resistor 61, in the above-described embodiment, may be a potentiometer having an arm 62 operated by a temperature responsive actuating means (not shown). The actuating means, which responds to the temperature of the cooling media that passed through the radiator heating element 10, moves the potentiometer arm 62 toward the conductor 63 as the temperature of the cooling media increases. This construction results in a decrease in the voltage applied to the field coil of the alternator 25 as the temperature of the cooling media increased, consequently reducing the voltage applied to the heating coils 29, 30 and 31 and the heat generated by these coils. When the temperature of the cooling media reaches a selected value, the temperature sensitive switch 81 opens and the regulator circuit 60 would return to the normal regulated mode of operation.

It should be noted that the contacts 72 function only as a safety device and may be eliminated from the circuit. In usual operation in the unregulated mode of operation, the current through the relay coil 72 is insufficient to cause actuation of the conductor 79, however, changes in temperature may cause the relay coil to respond to lower currents and for this reason the contacts are placed in the circuit. In a vehicle tested in Detroit, Michigan, these contacts have proven unnecessary.

Figure 2:
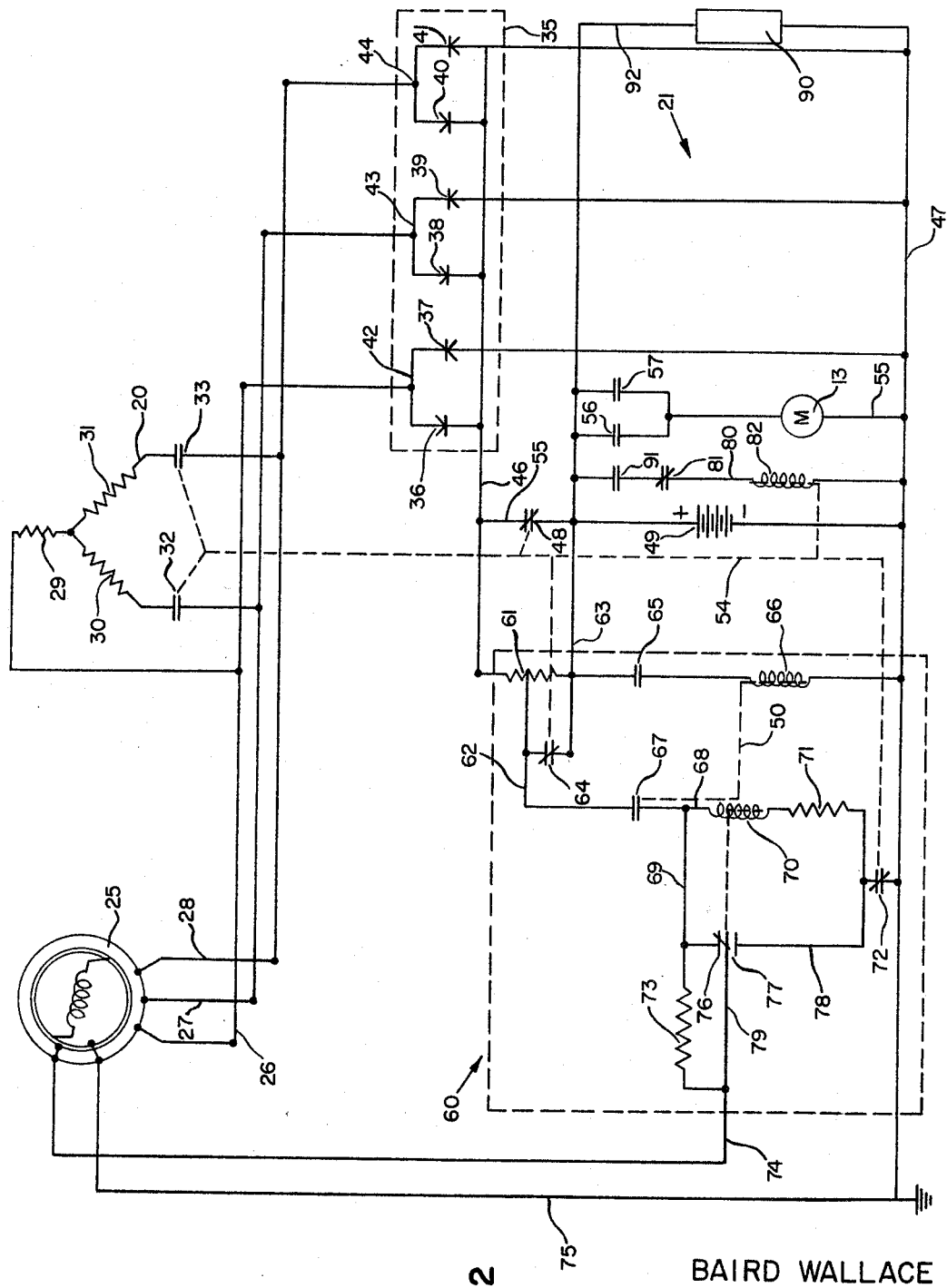
FIGURE 2 is a schematic diagram of the electrical circuit of the instant invention.

An alternate embodiment of the instant invention is shown in FIGURE 3 wherein like parts are identified by the same numerical designation assigned in FIGURE 2. In this embodiment, the battery 49 is connected directly to ground via the conductor 95 and the ground terminal 96. The resistor 61 is connected between the ground terminal 96 and the negative terminal 47 and is connected to the field coil of the alternator 25 by the conductor 75. A portion of the resistor 61 is connected between the conductor 75 and the ground terminal 96 and a portion is connected between the negative terminal 47 and the conductor 75. The resistor 61 functions in the same manner as the resistor 61 in FIGURE 2 and the portion of the resistor 61 between conductor 75 and negative terminal 47 performs the same function as the first portion of the resistor 61 in FIGURE 2.

The normally closed contacts 97 are connected across the ground terminal 96 and the negative terminal 47 and are operated by the relay coil 82. When the contacts 97 are in the normally closed position, the negative terminal 47 is directly connected to ground and is at ground potential. With both ends of the resistor 61 connected to ground, the portion of the resistor connected between the conductor 75 and the ground terminal 96 and the portion of the resistor connected between the conductor 75 and the negative terminal 47 can be considered in parallel and, therefore, contributing only a small amount of resistance to the overall circuit. It should be noted that the relay coil 82 controls only three sets of contacts 32, 33 and 97 as contrasted with the five contacts controlled in the embodiment shown in FIGURE 2.

In principle, the regulated mode of operation of the alternate embodiment, shown in FIGURE 3, is virtually identical with the regulated mode of operation of the embodiment shown in FIGURE 2. The conductor 79 of the regulator circuit 60 vibrates between contact 76 and an open position, causing the resistor 73 to alternately be placed in series and in parallel with the field coil or vibrating between contact 77 and an open position, resulting in the resistor 73 being in series with the field coil and then short circuiting the field coil.

The operation of the unregulated mode of operation of the alternate construction embodies a few modifications. Following the closure of the contacts 32 and 33 by the relay coil 82, the contacts 97 are opened. The opening of the contacts 97 eliminates the path from the field coil through the conductor 75, the resistor 61 and the positive terminal 46 to ground, and results in placing the resistor 61 in series with the negative terminal 47 and the conductor 96. The first portion of resistor 61 is placed in series with the field coil, while the entire resistor 61 is in series with the regulator circuit 60. With the positive terminal of the battery connected to the positive terminal 46 and the negative terminal of the battery connected to ground and the resistor 61 conneced in series, the relay 70 of the regulator circuit will be maintained at a voltage which will cause conductor 79 to remain in the normally closed position, short circuiting the resistor 73 and applying a maximum voltage to the field coil of the alternator 25. It should be apparent with the conductor 79 in the normally closed position, the regulator circuit will be ineffective and the alternator will be permitted to generate its maximum voltage.

The resistor 61 is physically located in the conduit 14 of the ventilation system along with the heating coils 26 and adds to the heat available. The resistor 61 may dissipate up to 500 watts of power. The ohmic value of resistor 61 may be tailored to meet the individual customer charging rate requirements and to meet the requirements of different geographical locations.

A heating system embodying the principle of the instant invention has been tested on a 1960 Ford Country Sedan. In the tested system a 50 amp alternator was used and was driven at a speed of about 2½ times the engine speed. At 20 m.p.h. and 0° F. ambient temperature, the discharged air from the ventilation system was 110° F. after two minutes of vehicle and heater operation. This is an increase of about 65° F. over the same car operated under the same conditions without a quick heat system.

It will be understood that the invention is not to be limited to the exact construction shown and described and that various changes and modifications may be made without departing from the spirit and scope of the invention, as defined in the appended claims.

I claim:

1. In a heating system for an automotive vehicle having a passenger compartment and a cooling system, the combination comprising, a radiator heating element for supplying heat to the passenger compartment, said heating element adapted to form part of the cooling system of the automotive vehicle, an electric heating element for supplying heat to the passenger compartment, a conduit operatively coupled with the atmosphere, said radiator heating element, said electric heating element, and the passenger compartment to carry air over said heating elements and to deliver the heated air to the passenger compartment, and an electrical circuit comprising, an alternator having a field coil, said alternator adapted to be operatively coupled in circuit with said electric heating element for supplying electrical energy to said electrical heating element, a rectifier connected in circuit with said alternator to supply a substantially direct current, a regulator circuit means connected in circuit with said rectifier and said field coil of the alternator for controlling the amount of direct current supplied to said field coil of the alternator, a first set of normally open contacts in circuit with said rectifier, a relay coil electrically and operatively connected in circuit with said first set of normally open contacts to be energized when said first set of normally open contacts are closed, a switch having a set of normally open contacts in circuit with said electric heating element and said alternator to operatvely couple said heating element to said alternator when closed and a set of normally closed contacts in circuit with the regulator circuit and ground to limit the effectiveness of said regulator circuit means when opened, said normally open contacts and said normally closed contacts of said switch connected to said relay coil to be operated by said relay coil when said relay coil is energized and a control means for closing said first set of normally open contacts that are connected in circuit with said rectifier and said relay coil, whereby the relay coil operates the contacts of said switch to operatively couple the heating element to said alternator and to limit the effectiveness of the regulator circuit means.

2. The structure defined in claim 1 wherein said switch of said electrical circuit is a make-break switch that is connected to said relay coil to first close said normally open contacts and to subsequently open said normally closed contacts.

3. The structure defined in claim 1 wherein a temperature sensitive switch having a set of normally closed contacts is connected in circuit with said rectifier and said relay coil, said temperature sensitive switch located adjacent the radiator heating element and adapted to open its normally closed contacts when said radiator heating element reaches a selected temperature, thereby de-energizing said relay coil.

4. The structure defined in claim 1 wherein an electric load is connected to said rectifier and ground, a resistor is operatively connected in circuit with the rectifier and said load, and a first set of normally closed contacts is connected in parallel across said resistor to limit the current supplied to the load when opened, said normally closed contacts connected to be operated by said relay coil, whereby opening of said first set of normally closed contacts will limit the direct current supplied to the load.

5. In a heating system for an automotive vehicle having a passenger compartment and a cooling system, the combination comprising; a radiator heating element for supplying heat to the passenger compartment, said heating element adapted to form part of the cooling system of the automotive vehicle, an electric heating element for supplying heat to the passenger compartment; a conduit operatively coupled with the atmosphere, said radiator heating element, said electric heating element, and the passenger compartment to carry air over said heating elements and to deliver the heated air to the passenger compartment; and an electrical circuit comprising, an alternator having a field coil, said alternator adapted to be connected in circuit with said electric heating element for supplying electrical energy to said electrical heating element, a rectifier connected in circuit with said alternator to supply a direct current, a regulator circuit means connected in circuit with said rectifier and said field coil of the alternator for controlling the amount of direct current supplied to said field coil of the alternator, a first set of normally open contacts in circuit with said rectifier, a relay coil electrically and operatively connected to said first set of normally open contacts to be energized when said first set of said normally open contacts are closed, a switch having a set of normally open contacts interposed between said electric heating element and said alternator to connect said heating element to said alternator when closed and a set of normally closed contacts interposed between the regulator circuit means and ground to limit the effectiveness of the regulator circuit means when opened, said normally open contacts and said normally closed contacts of said switch connected to said relay coil to be operated by said relay coil when said relay coil is energized and a manually operated switched for closing said first set of normally open contacts that are connected in circuit with said rectifier and said relay coil, whereby the relay coil operates the contacts of said switch to connect the electrical heating element to said alternator and to limit the effectiveness of the regulator circuit means.

6. In a heating system for an automotive vehicle having a passenger compartment and a cooling system, the combination comprising: a radiator heating element for supplying heat to the passenger compartment, said heating element adapted to form part of the cooling system of automotive vehicle, an electric heating element for supplying heat to the passenger compartment; a conduit operatively coupled with the atmosphere, said radiator heating element, said electric heat element, and the passenger compartment to carry air over said heating elements and to deliver the heated air to the passenger compartment; and an electrical circuit comprising, an alternator having a field coil, said alternator adapted to be connected in circuit with said electric heating element for supplying electrical energy to said electrical heating element, a positive terminal, a negative terminal, a rectifier connected in circuit with said alternator to supply a direct current to said positive and negative terminals, a regulator circuit means connected in circuit with said positive terminal and said field coil of the alternator for controlling the amount of direct current supplied to said field coil of the alternator, a ground terminal connected to ground, a load connected across said positive ground terminals, a first set of normally open contacts in circuit with said positive terminals, a relay coil electrically and operatively connected in circuit with said first set of normally open contacts to be energized when said first set of normally open contacts are closed, a switch having a set of normally open contacts in circuit with said electric heating element and said alternator to connect said heating element to said alternator when closed and a set of normally closed contacts connected across said negative and ground terminals to limit the effectiveness of said regulator circuit means when opened, said normally open contacts and said normally closed contacts of said switch connected to said relay coil to be operated by said relay coil when said relay coil is energized, and a manually operated switch for closing said first set of normally open contacts between said rectifier and said relay coil, whereby the relay coil operates the contacts of said switch to connect the electrical heating element to said alternator and to limit the effectiveness of the regulator circuit means.

7. In a heating system for an automotive vehicle having a passenger compartment, the combination comprising: an electric heating element for supplying heat to the passenger compartment; a conduit operatively coupled with the atmosphere, said electric heating element, and the passenger compartment to carry air over said electric heating element and to deliver the heated air to the passenger compartment; and an electrical circuit comprising, an alternator having a field coil, said alternator adapted to be connected in circuit with said electric heating element for supplying electrical energy to said electrical heating element, a positive terminal, a negative terminal, a rectifier connected in circuit with said alternator and connected to said positive and negative terminals to supply a direct current to said positive and negative terminals, a regulator circuit connected in circuit with said positive terminal and said field coil of the alternator for controlling the amount of direct current supplied by said rectifier to said field coil of the alternator, a ground terminal connected to ground and said regulator circuit, a load connected across said positive and ground terminals, a first set of normally open contacts in circuit with said positive terminal and adapted to control the energization of a relay coil, a relay coil electrically and operatively connected in circuit with said first set of normally open contacts to be energized when said first set of normally open contacts close, a switch having a set of normally open contacts in circuit with said electric heating element and said alternator to connect said heating element to said alternator when closed and a set of normally closed contacts connected across said negative and ground terminals to reduce the effectiveness of said regulator circuit when opened, said normally open contacts and said normally closed contacts of said switch connected to said relay coil to be operated by said relay coil when said relay coil is energized, a resistor connected to said field coil and across said negative and ground terminals, said resistance connected in circuit so that the opening and closing of said normally closed contact of said switch alters the amount of resistance in circuit with the ground terminals, and a control means for closing said first set of normally open contacts between said rectifier and said relay coil, whereby the relay coil operates the contacts of said switch to connect the heating element to said alternator and to limit the effectiveness of the regulator circuit.

8. In a heating system for an automotive vehicle having a passenger compartment, the combination comprising: an electric heating element for supplying heat to the passenger compartment; a conduit operatively coupled with the atmosphere, said electric heating element, and the passenger compartment to carry air over said electric heating element and to deliver the heated air to the passenger compartment; and an electrical circuit comprising, an alternator having a field coil, said alternator adapted to be connected in circuit with said electric heating element for supplying electrical energy to said electrical heating element, a positive terminal, a negative terminal, a rectifier connected in circuit with said alternator and connected to said positive and negative terminals to supply a direct current to said positive and negative terminals, a regulator circuit connected in circuit with said positive terminal and said field coil of the alternator for controlling the amount of direct current supplied to said field coil of the alternator, a ground terminal operatively connected to ground and to said regulator circuit, a load connected across said positive and ground terminals, a first set of normally open contacts connected in circuit to energize a relay coil when closed, a relay coil, said first set of normally open contacts and said relay coil connected in circuit across said positive terminal and said ground terminal, a switch having a set of normally open contacts in circuit with said electric heating element and said alternator to connect said heating element to said alternator when closed and a set of normally closed contacts across said negative and ground terminals to limit the effectiveness of said regulator circuit wehn opened, said normally open contacts and said normally closed contacts of said switch connected to said relay coil to be operated by said relay coil when said relay coil is energized, a resistor connected to said field coil and across said negative and ground terminals, said resistance connected in circuit so that the opening and closing of said normally closed contact of said switch alters the amount of resistance in circuit with said ground terminal, and a control means for closing said first set of normally open contacts between said rectifier and said relay coil, whereby the relay coil operates the contacts of said switch to connect the electric heating element to said alternator and to limit the effectiveness of the regulator circuit.

9. In a heating system for an automotive vehicle having a passenger compartment and a cooling system, the combination comprising: a radiator heating element for supplying heat to the passenger compartment, said heating element adapted to form part of the cooling system of the automotive vehicle; an electric heating element for supplying heat to the passenger compartment; a conduit operatively coupled with the atmosphere, said radiator heating element, said electric heating element, and the passenger compartment to carry air over said heating elements and to deliver air to the passenger compartment; and an electrical circuit comprising, an alternator having a field coil, said alternator adapted to be connected in circuit with said electric heating elements for supplying electrical energy to said electrical heating element, a rectifier connected in circuit with said alternator, a regulator circuit means connected in circuit with said rectifier and said field coil of said alternator for controlling the amount of energy supplied to said field coil of said alternator, a first set of contacts operatively connected to said rectifier, a relay coil electrically and operatively connected in circuit with said first set of contacts to be energized when said first set of contacts are operated, a switch having a second set of contacts in circuit with said electric heating element and said alternator to operatively couple said heating element to said alternator when said second set of contacts are operated, and a third set of contacts in circuit with said regulator circuit means to limit the effectiveness of said regulator circuit means when said third set of contacts are operated, said second set of contacts and said third set of contacts connected to said relay coil to be operated by said relay coil when said relay coil is energized by the operation of said first set of contacts, and a control means for opearting said first set of contacts that are connected in circuit with said rectifier and said relay coil, whereby the relay coil operates the second and third set of contacts to operatively couple the electric heating element to said alternator and to limit the effectiveness of the regulator circuit.

10. The structure defined in claim 9 wherein an electric load is operatively connected in circuit with said recifier, a resistor is adapted to be connected in circuit with the rectifier and said load to limit the current supplied by said rectifier to said load, and a fourth set of contacts is operatively connected in circuit with said resistor to couple said resistor to said rectifier and said load so that the current supplied to the load is limited when said fourth set of contacts are operated, said fourth set of contacts connected to be operated by said relay coil.

11. The structure defined in claim 9 wherein an electric load is operatively connected to said rectifier, a resistor is adapted to be operatively connected in circuit with said rectifier and said load to limit the amount of current supplied to said load and said third set of contacts is connected in circuit with said resistor to connect said resistor to said rectifier and load to limit the current supplied to said load.

12. In an automotive vehicle, a passenger compartment, an electrical generator operated by said vehicle, an electrical load including a vehicle storage battery connectable to said electrical generator, control means coupled to said electrical generator for operating said electrical generator in either a regulated or unregulated mode, the output of said electrical generator being substantially higher when operated in the unregulated mode, a resistor, said control means including means for connecting said resistor in series with said electrical generator and said electrical storage battery when said control means operates said electrical generator in its unregulated mode, said resistor producing a voltage drop substantially equal to the difference between the output voltage of said electrical generator and the terminal voltage of said vehicle storage battery when said electrical generator is operated in the unregulated mode, an electrical heater coupled to said generator, said electrical heater being positioned in the automotive vehicle and in communication with said passenger compartment, and being capable of supplying a substantial amount of heat to said passenger compartment when said generator is operated in the unregulated mode, said resistor being positioned to supply to said passenger compartment the heat developed by the power dissipated in said resistor when said electrical generator is operated in the unregulated mode.

13. In a heating system for an automotive vehicle, a passenger compartment, a heating duct coupled to said passenger compartment, an electrical generator, an electrical load including a vehicle storage battery connectable to said electrical generator, control means coupled to said electrical generator for operating said electrical generator in either a regulated or an unregulated mode, a resistor, said control means including means for connecting said resistor in series with said electrical generator and said electrical storage battery when said electrical generator is operated in the unregulated mode so that said resistor absorbs the voltage difference between the output voltage of said electrical generator and the terminal voltage of said electrical storage battery when said electrical generator is operated in its unregulated mode, an electrical heater means coupled to said electrical generator, said electrical heater means positioned in said heating duct and capable of supplying a substantial amount of heat to said passenger compartment when said electrical generator is operated in the unregulated mode, said resistor positioned in said heating duct adjacent said electrical heater means, a fan positioned in said heating duct for moving air from said duct into said passenger compartment over said electrical heater means and said resistor, whereby the air passing over said electrical heating means and said resistor delivers the heat developed by said electrical heater means and by the power dissipated in said resistor to said passenger compartment when said electrical generator is operated in the unregulated mode.

14. In a heating system for an automotive vehicle, a passenger compartment, a heating duct coupled to said passenger compartment, an electrical generator, an electrical load including a vehicle storage battery connectable to said electrical generator, control means coupled to said electrical generator for operating said electrical generator in either a regulated or an unregulated mode, a resistor, said control means including means for connecting said resistor in series with said electrical generator and said electrical storage battery when said electrical generator is operated in the unregulated mode, said resistor having a magnitude capable of supporting a voltage drop defined by the difference between the output voltage of said electrical generating means and the terminal voltage of said battery when said electrical generating means is operated in the unregulated mode, an electrical heater means coupled to said electrical generator, said electrical heater means positioned in said heating duct and capable of supplying a substantial amount of heat to said passenger compartment when said generator is operated in the unregulated mode, a fan positioned in said heating duct for moving air from said duct into said passenger compartment over said electrical heater means, said resistor positioned in said heating duct adjacent said electrical heating means whereby the air passing over said electrical heating means from said fan also passes over said resistor to deliver the heat developed by the power dissipated in said resistor to said passenger compartment when said electrical generator is operated in the unregulated mode.

15. In an automotive vehicle, a passenger compartment, a heating system including a primary heating means, a ventilating system for supplying the heat of said primary heating means to said passenger compartment, an electrical system including an electrical generator having a field, an electrical storage battery and a regulator connected in circuit, said regulator normally limiting the amount of electrical energy applied to the field of said electrical generator, an electric quick heat means operatively placed in said ventilation system to supply heat to said passenger compartment, said electric quick heat means coupled to said electrical generator, a sensing means for sensing when said primary heating means has reached a given operating temperature, a resistor, a control circuit means for reducing the effectiveness of said regulator circuit to limit the electrical energy applied to said field and for connecting said resistor in series with said electrical generator and said electrical storage battery when said sensing means senses a temperature below said operating temperature, said resistor having a magnitude such that a voltage drop equal to the difference between the output voltage of said electrical generator and the terminal voltage of said electrical storage battery will appear across said resistor and said electrical generating means will produce a substantially larger voltage than when said regulator circuit is fully effective, said control circuit returning said regulator circuit to normal operation and disconnecting said resistor from series connection with said electrical generator and said electrical storage battery when a temperature equal to or greater than said operating temperature is sensed by said sensing means, said control circuit means connected to said sensing means to be operated by said sensing means, said resistor being operatively positioned in said ventilation system and contributing to the heat generated by said electric quick heat means when said electric quick heat means is operative to supply heat to said passenger compartment.

16. In an automotive vehicle, a passenger compartment, a heating system including a primary heating means, a ventilating system for supplying the heat of said primary heating means to said passenger compartment, an electrical system including an electrical generator having a field, an electrical storage battery and a regulator connected in circuit, said regulator normally limiting the amount of electrical energy applied to the field of said electrical generator, an electric quick heat means operatively placed in said ventilation system to supply heat to said passenger compartment, said electric quick heat means coupled to said electrical generator, a sensing means for sensing when said primary heating means has reached a given operating temperature, a resistor, a control circuit means for reducing the effectiveness of said regulator circuit to limit the electrical energy applied to said field and for connecting said resistor in series with said electrical generator and said electrical storage battery when said sensing means senses a temperature below said operating temperature, said resistor having a magnitude capable of supporting a voltage drop defined by the difference between the output voltage of said electrical generating means and the terminal voltage of said battery when said control circuit means is effective for reducing the effectiveness of said regulator, said control circuit returning said regulator circuit to normal operation and disconnecting said resistor from series connection with said electrical generator and said electrical storage battery when a temperature equal to or greater than said operating temperature is sensed by said sensing means, said control circuit means connected to said sensing means to be operated by said sensing means, said resistor being operatively positioned in said ventilation system and contributing to the heat generated by said electric quick heat means when said electric quick heat means is operative to supply heat to said passenger compartment.

17. In an automotive vehicle, a passenger compartment, an electrical generator capable of regulated and unregulated modes of operation with respect to electrical energy output, an electrical storage battery, regulating means coupled to said electrical generator for operating said electrical generator in either a regulated mode or an unregulated mode of operation with respect to the electrical energy output of said electrical generator, a resistor, means coupled to said regulator for causing said electrical generator to operate either in its regulated or its unregulated mode and for connecting said resistor in series with said electrical generator and said electrical storage battery during the unregulated mode of operation so that said resistor absorbs the voltage difference between the output voltage of said electrical generator and the terminal voltage of said electrical storage battery when said electrical generator is operated in its unregulated mode, an electrical heater means coupled to said electrical generator and capable of producing a substantial amount of heat, said electrical heater means and said resistor being positioned to supply the heat developed in both said electrical heater means and said resistor to said passenger compartment.

18. The combination of claim 17 in which a heating duct is coupled to said passenger compartment, said electrical heating means and said resistor are positioned in said heating duct, and a fan energized by said electrical storage battery and said electrical generator moves air over said electrical heater means and said resistor into said passenger compartment.

References Cited by the Examiner

UNITED STATES PATENTS

| | | | |
|---|---|---|---|
| 2,158,733 | 5/1939 | Sola | 219—202 X |
| 2,827,540 | 3/1958 | Underwood | 219—279 |

RICHARD M. WOOD, *Primary Examiner.*

ANTHONY BARTIS, *Examiner.*